March 8, 1966 A. SCHMERMUND 3,239,085
FEEDING DEVICES
Filed March 1, 1962 10 Sheets-Sheet 1

INVENTOR
ALFRED SCHMERMUND
BY: Wolte & Wolte
ATTORNEYS

March 8, 1966  A. SCHMERMUND  3,239,085
FEEDING DEVICES
Filed March 1, 1962  10 Sheets-Sheet 2

INVENTOR
ALFRED SCHMERMUND
By: Holte & Holte
ATTORNEYS

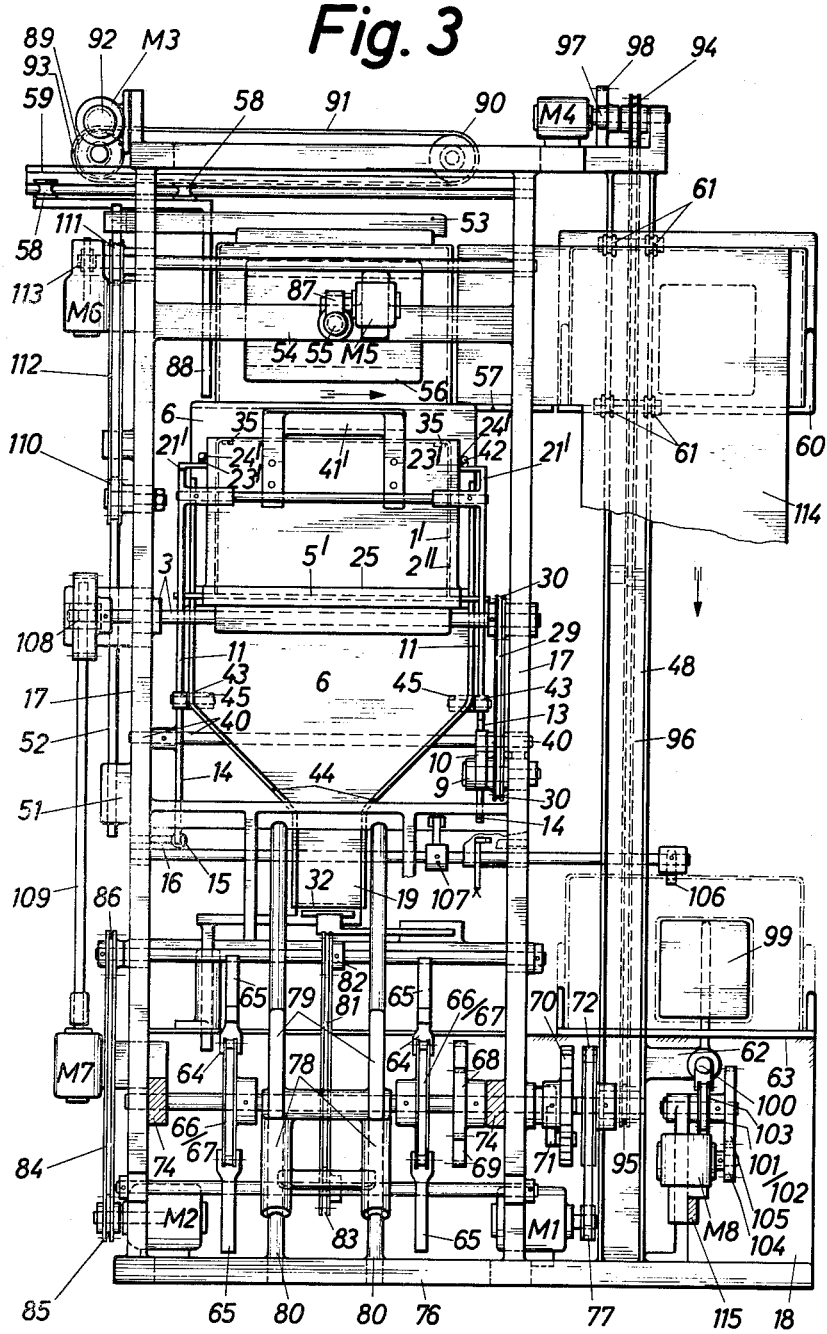

March 8, 1966 A. SCHMERMUND 3,239,085
FEEDING DEVICES
Filed March 1, 1962 10 Sheets-Sheet 4
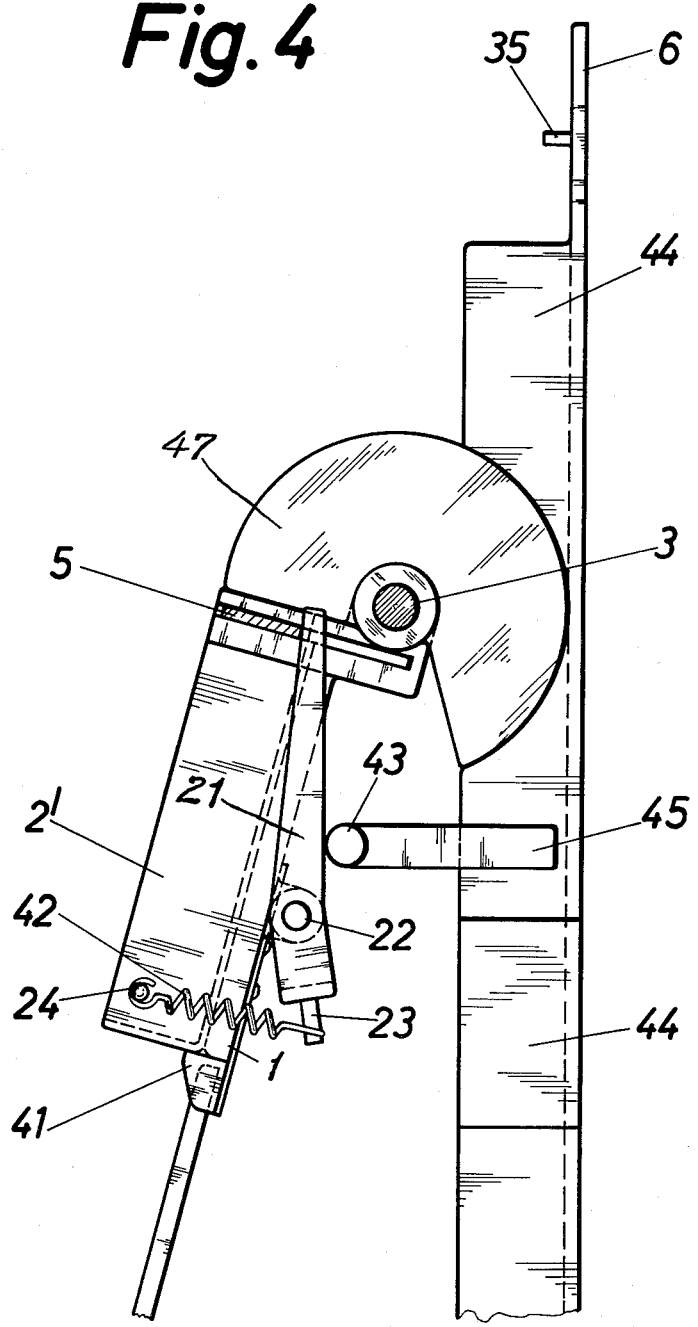
INVENTOR
ALFRED SCHMERMUND
By: Holte & Holte
ATTORNEYS

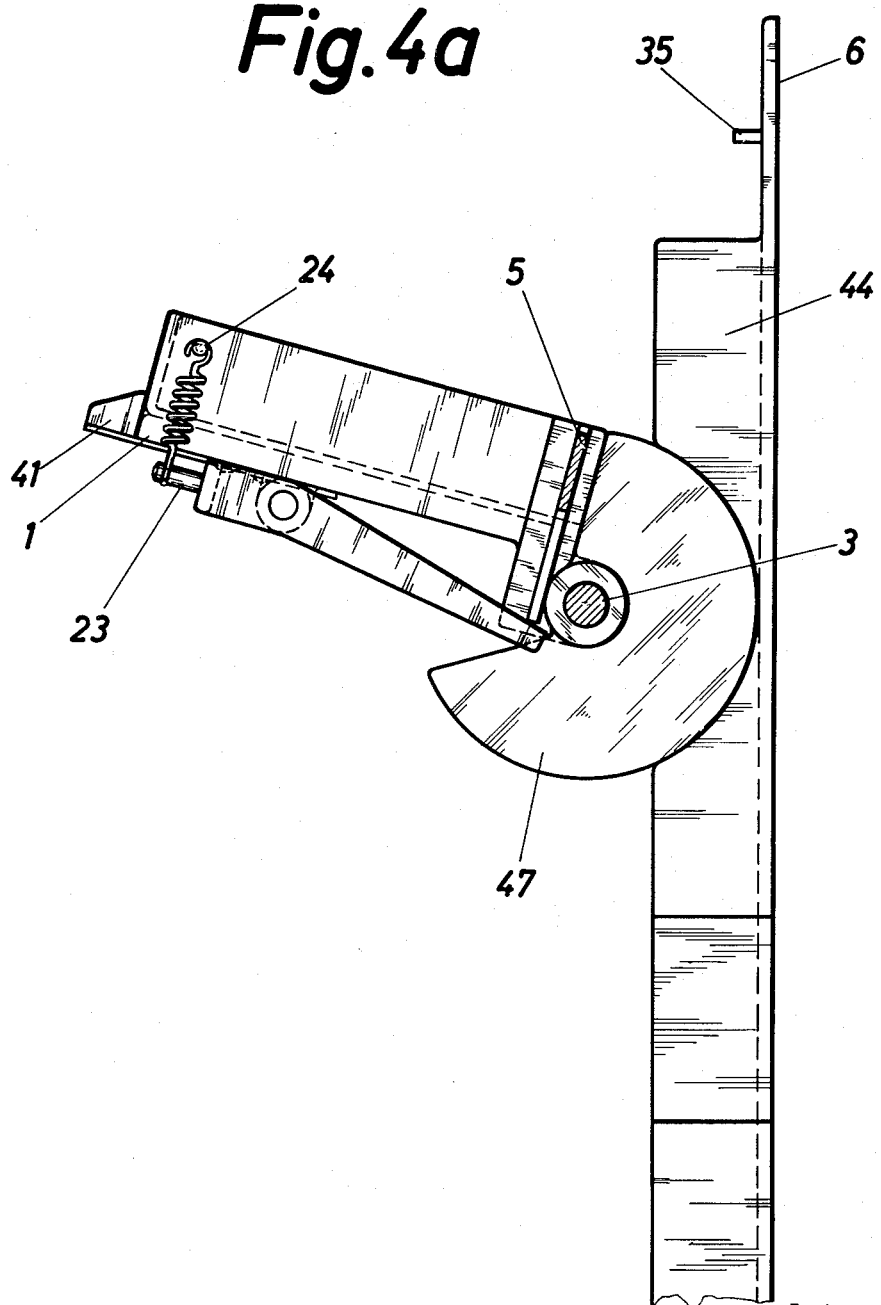

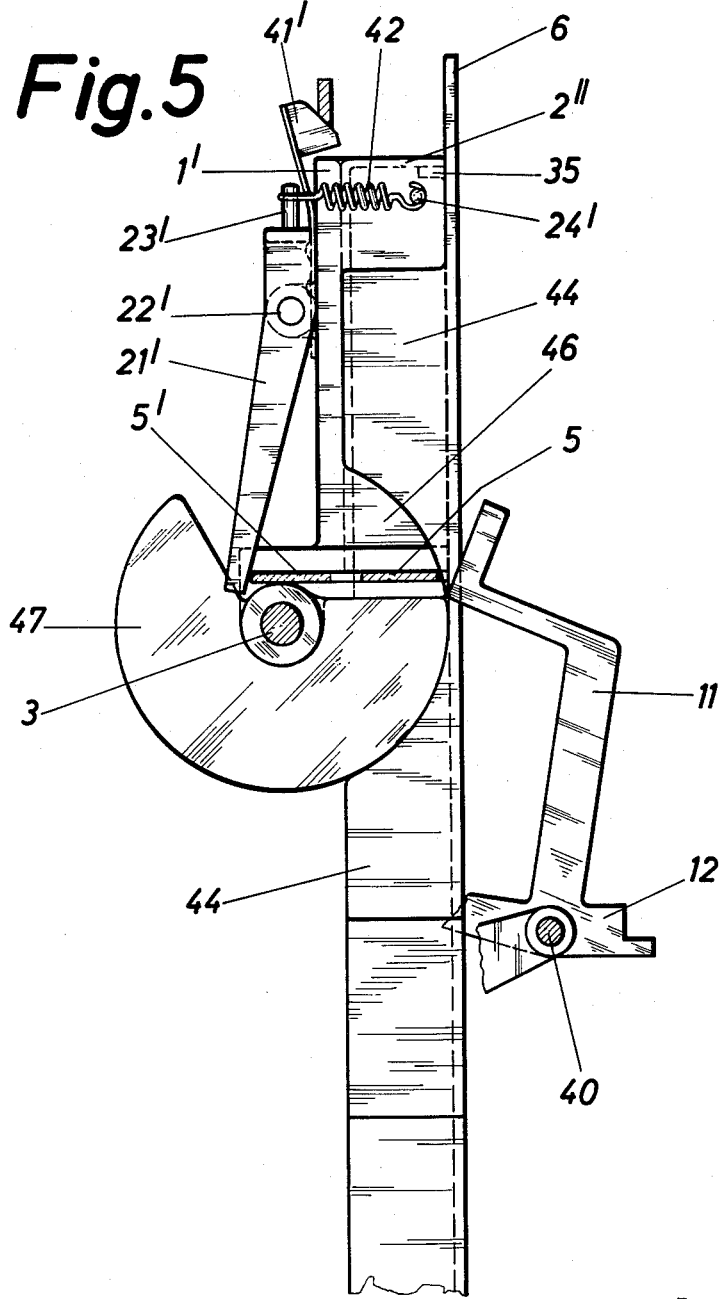

March 8, 1966 A. SCHMERMUND 3,239,085
FEEDING DEVICES
Filed March 1, 1962 10 Sheets-Sheet 7

INVENTOR
ALFRED SCHMERMUND
By: Holte & Holte
ATTORNEYS

March 8, 1966 A. SCHMERMUND 3,239,085
FEEDING DEVICES
Filed March 1, 1962 10 Sheets-Sheet 9

INVENTOR
ALFRED SCHMERMUND
By: Holte & Holte
ATTORNEYS

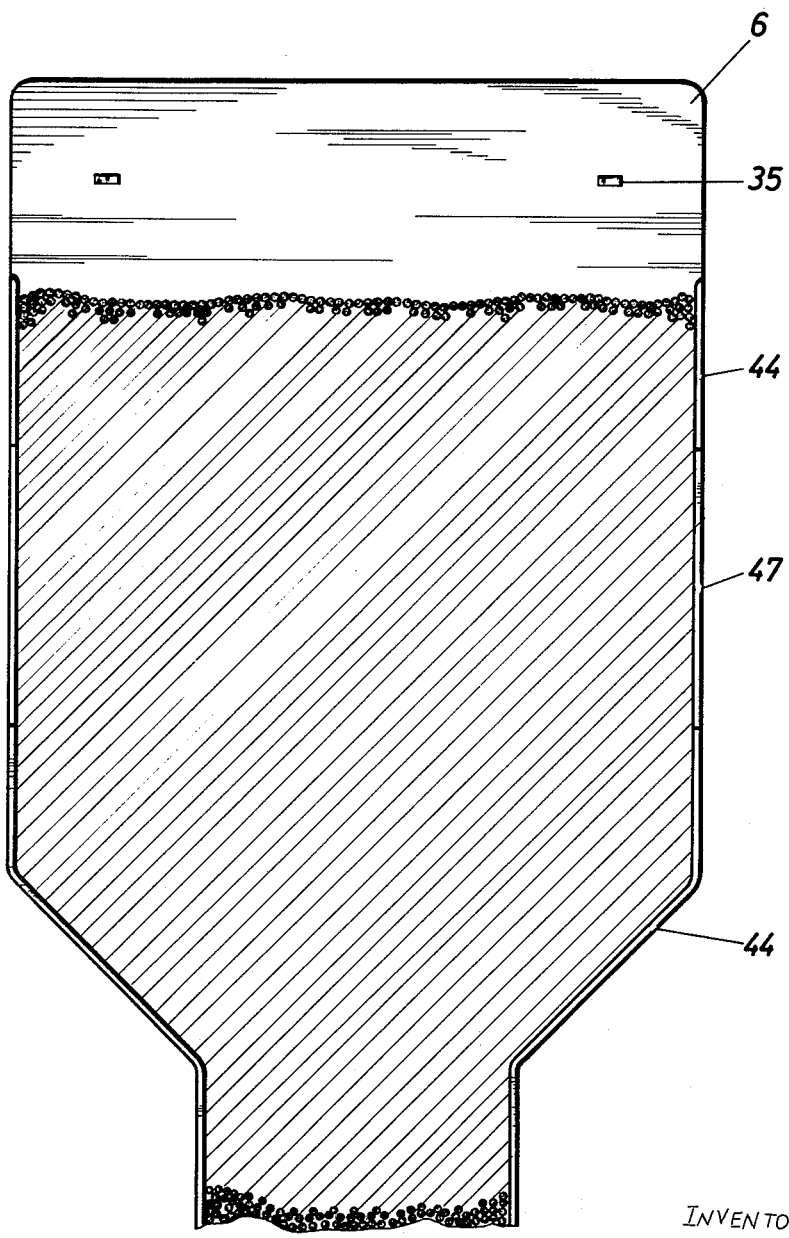

3,239,085
FEEDING DEVICES
Alfred Schmermund, 62 Kornerstrasse, Gevelsberg,
Westphalia, Germany
Filed Mar. 1, 1962, Ser. No. 176,750
Claims priority, application Germany, Mar. 3, 1961,
Sch 29,332
9 Claims. (Cl. 214—307)

The invention relates to devices for feeding elongated articles, for example cigarettes or cigars, to packing machines.

It is an object of the invention to provide such a feeding device, which operates automatically.

It is a further object to provide such a device which comprises a frame arrangement adapted for receiving a magazine of articles and arranged for moving said magazine from an oblique position into a substantially vertical position for discharge of articles therefrom, a member defining the bottom of the frame arrangement when the frame arrangement is in its substantially vertical position being displaceable in a direction substantially parallel to the transverse axis of the said member and serving for blocking a discharge opening of the magazine until the frame arrangement has been moved into the substantially vertical position and the bottom member displaced, means being provided for successively transporting magazines of articles to the frame arrangement when the frame arrangement is in the said oblique position.

These and other objects and advantages of the invention will become apparent from the following detailed description of a cigarette feeding machine when read in conjunction with the appended drawings, which are given by way of example and in which:

FIG. 3 is an end view of the feeding device shown in FIGS. 1 and 2 and taken in the direction of the arrows III–III–III of FIG. 1, FIG. 3 being on substantially the same scale as FIG. 1;

FIG. 4 shows in greater detail a side view of a frame arrangement and a portion of a hopper forming part of the device of FIG. 1, the frame arrangement being disposed in an oblique position;

FIG. 4a is similar to FIG. 4 but with the frame arrangement in a different position;

FIG. 5 is similar to FIGS. 4 and 4a but showing the frame arrangement disposed in its upright position, and also illustrating parts of a lever arrangement shown in FIGS. 1 and 3;

FIG. 9 is similar to FIG. 8 but with the container removed.

Figure 1:
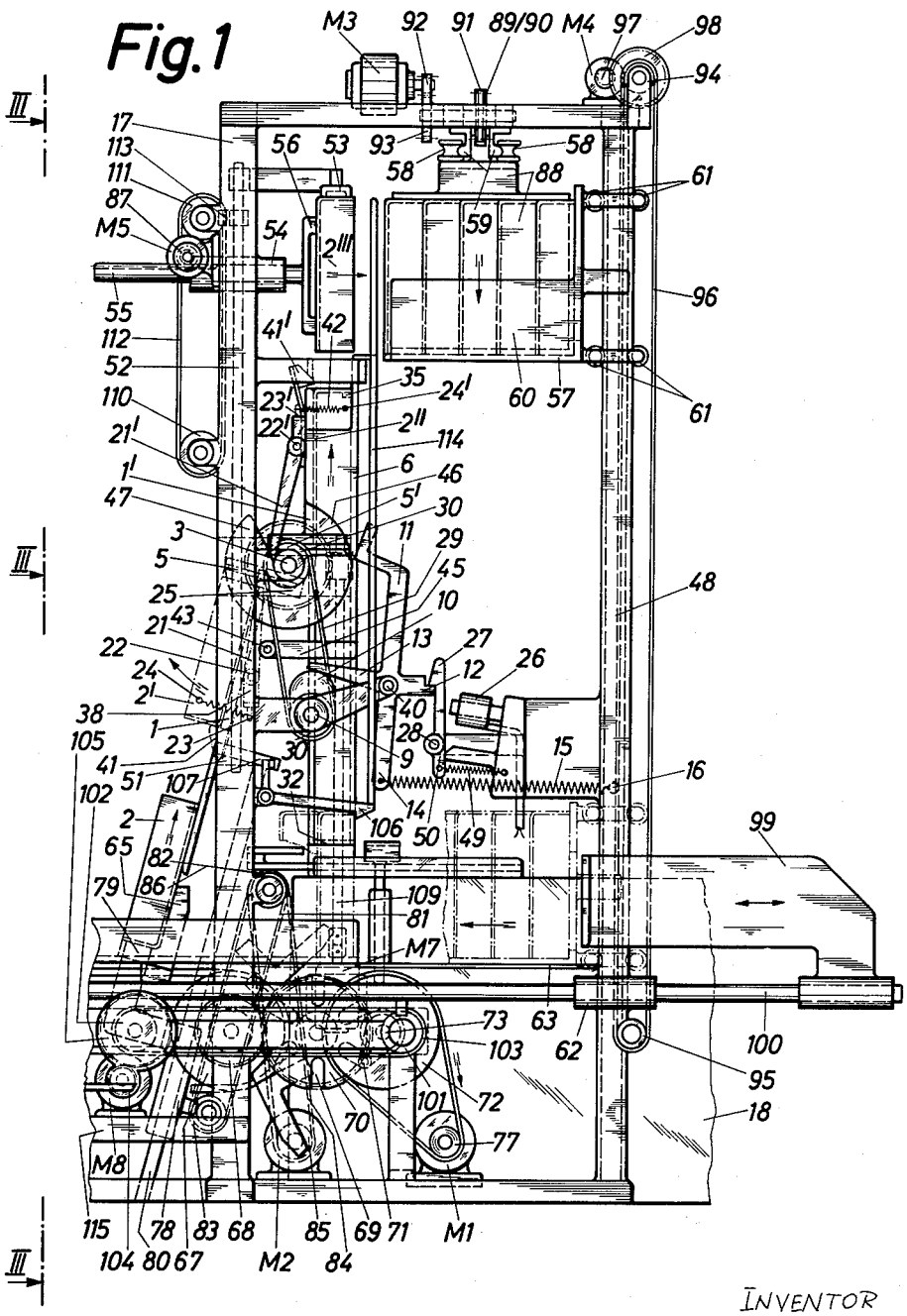
FIG. 1 is a partial side view of a cigarette feeding device.
Figure 2:
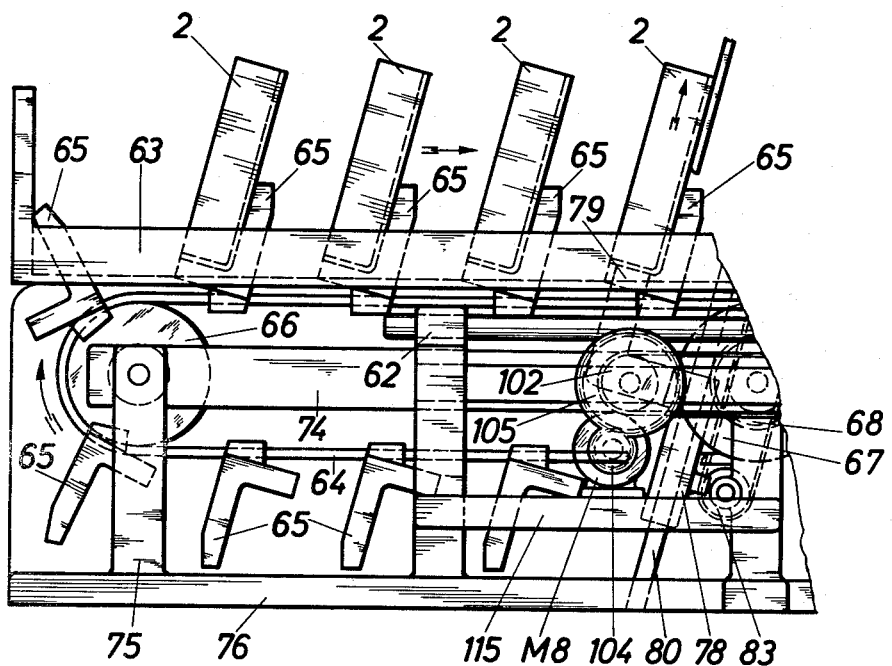
FIG. 2 is a partial side view illustrating parts of a conveyor device omitted from FIG. 1 and is on a larger scale than FIG. 1.
Figure 6:
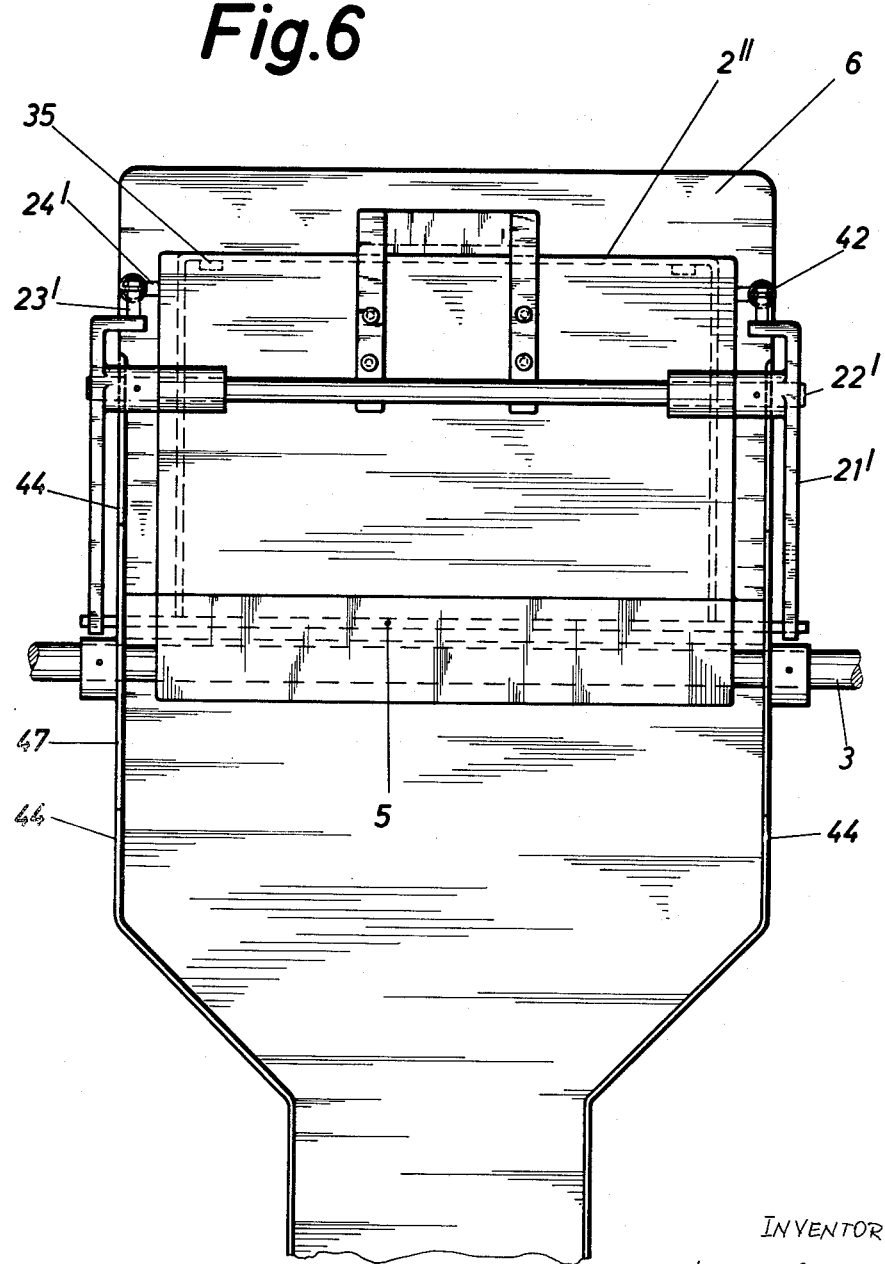
FIG. 6 shows a detail of FIG. 3 on a larger scale.

As shown in FIGS. 1 and 3, the cigarette feeding device comprises a frame arrangement 1 mounted on a shaft 3, the frame arrangement 1 serving for successively receiving containers 2 and tipping them into a vertical position 2″. A conveyor device, parts of which are shown in FIG. 1 and other parts of which are shown on a larger scale in FIG. 2, is provided for feeding magazines 2 of cigarettes to the frame arrangement 1. The conveyor device comprises a pair of conveyor chains 64 which are entrained over chain wheels 66 and 67 mounted on fixed parts 74 and 75 of the device, as seen in FIGS. 2 and 3. The chains 64 carry obliquely positioned angular holding members 65 onto which full containers 2 are placed by hand, the chains 64 being moved in a step by step manner by a Maltese cross mechanism 70, 71 and a toothed wheel drive 68, 69, the steps equalling the spacing between the holding members 65, with the effect that full containers 2 are successively moved into the range of a lifting mechanism 78, 79 which is arranged for acting in a plane parallel to the oblique planes of the magazines 2 in the holding members 65. The lifting mechanism 78, 79 in each case lifts the magazine 2, which has moved into its range, as will be described herein in more detail, from the position shown in full lines in FIG. 1 into the position 2′ shown in broken lines in FIG. 1. In order that on return of the lifting mechanism 78, 79, the lifted magazine 2 does not fall, a wide latch member 41 is provided which is controlled in such a manner that an upward movement of the magazine 2 and entry thereof into the frame arrangement 1 the latch member 41 yields so as not to substantially impede the entry. As seen in FIGS. 3 and 4, the wide latch member 41 is carried by two light leaf springs secured to the frame arrangement 1. When one of the containers 2 is lifted by the lifting mechanism, the latch member therefore deflects upon the springs but afterwards returns to its original position and prevents downward movement of the container.

When the lifting mechanism 78, 79 has returned, the frame arrangement 1 is automatically rotated by the shaft 3 from the position shown in FIG. 4, in which the frame arrangement is in its oblique position, through the intermediate position shown in FIG. 4a so as to come to rest in position 1′, shown in FIG. 5, in which it is vertical and above a supply hopper 44 of the packing machine, the magazine 2 in the frame arrangement being held onto a back plate 6 of the supply hopper 44 by laterally provided supporting fingers 35, the height and lateral position of the magazine 2 being maintained by these fingers even after the frame arrangement has been swung back to the oblique position. As shown in FIGS. 3, 4 and 5, the support fingers 35 are formed of simple flat strips of steel which are fixed to the wall 6 of the supply hopper 44 and project therefrom. As shown in FIG. 3, the supply hopper 44 has an exit chute portion 19 and an exit chute opening 32, and is backed by a separating wall 114.

The frame arrangement 1 has a bar-like blocking member 5 which is movable, in a direction parallel to its own transverse axis in guides 25 provided on side walls of the frame arrangement 1. The blocking member 5 serves for preventing cigarettes from falling from the magazine 2 while the magazine 2 is being swung from the oblique position 2′ into the position 2″.

Figure 8:
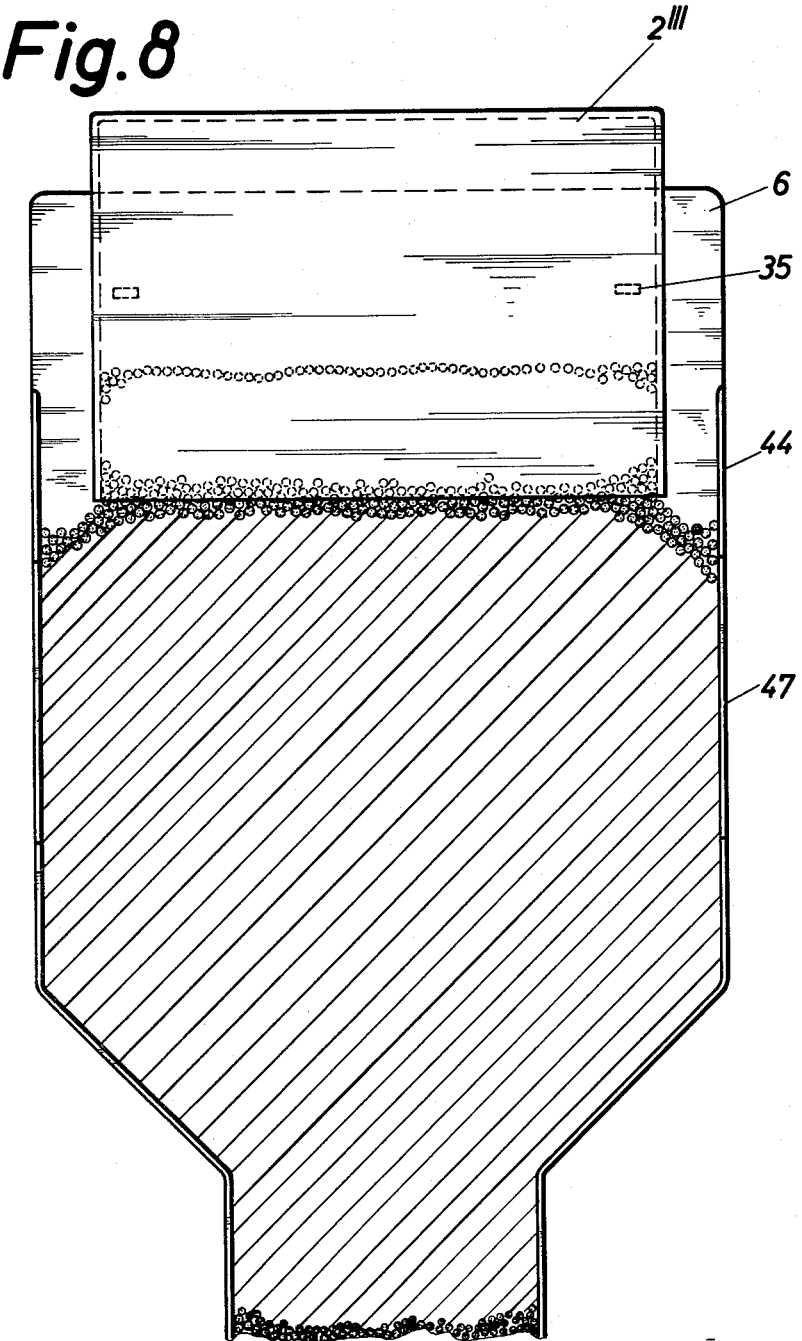
FIG. 8 is similar to FIG. 7 but shows the container open and raised.

A pair of striking levers 11, 12, 13, 14 are provided for striking the blocking member, to move the blocking member in the guides 25 into the position shown in broken lines in FIG. 5 and indicated by reference numeral 5′, when the frame arrangement 1 is moved into the position 1' and thus allowing the cigarettes in the magazine 2 to fall into the supply hopper 6, 44, as shown in FIG. 8. The striking levers are mounted on a shaft 40, between fixed parts 17 of the device, arms 11 of the levers engaging ends of the blocking member 5, arms 14 of the levers being acted on by tension springs 15 extending between the arms 14 and pins 16 provided on the fixed parts 17 of the device, the fixed parts 17 being secured to a base part 76, 18 of the device. Striking movement of the lever arms 11 is normally prevented by latching levers 27 which are mounted for common movement on a shaft 28 and which latchingly engage arms 12 of the levers. The latching levers 27 are normally urged into their latching position by tension springs 49 acting between pins 50 provided on the latching levers 27 and a fixed part of the device. For effecting the striking movement when the frame arrangement 1 has been moved into the position 1', the latching levers 27 are released from their latching engagement by energization of an electromagnet 26 which is mounted on a fixed part of the device and which is energized by a contact set (not shown) operated on movement of the frame arrangement 1 into the position 1'. The striking levers 11, 12, 13, 14 thus move anticlockwise as viewed in FIG. 1, the arms 11 striking the blocking member 5 into the position 5'. The frame arrangement 1 is then moved into the oblique position by rotation of the shaft 3 ready for insertion of a fresh magazine 2 therein. When moving back into the oblique position, lever members 21 mounted on a shaft 22 on the frame arrangement 1 impinge upon fixed abutment rollers 43 carried on fixed supports 45, ends of the lever members 21 acting on end regions of the blocking member 5 and returning it to its blocking position, as shown in FIG. 4. Tension springs 42 extending between extensions 23 of extension arms 38 of the lever members 21 and pins 24 provided on the frame arrangement 1 serve to remove the lever members 21 from engagement with the blocking member 5 when the frame arrangement is moved into the position 1'. In the position 1' of the frame arrangement 1, shown in FIG. 5, components 21, 22, 23 and 24 are indicated by reference numerals 21', 22', 23' and 24'.

On movement of the frame arrangement 1 into the oblique position, the striking levers 11, 12, 13, 14 are moved into their latched position by engagement of a cam 10 with an arm 13 of one of the levers 11, 12, 13, 14. Referring now to FIG. 1, the cam 10 is mounted on a shaft 9 on a fixed part of the device and is secured to a chain wheel 30 which is in driven connection, by a chain 29, with a chain wheel 30 mounted on the shaft 3 for rotation with movement of the frame arrangement 1. The cam 10 is so arranged that on movement of the frame arrangement 1 into its oblique position the striking levers are rotated in a clockwise direction as viewed in FIG. 1 until the lever arms 12 are latched by the latching levers 27.

After a magazine 2 has been moved from the position 2' to the position 2" approximately 30 to 40 seconds must elapse before it is empty. In order to allow a saving of time and to prevent a great drop in the level of cigarettes in the hopper 44, during the time taken to remove an empty magazine and provide a fresh, full magazine above the hopper, the device is so adapted that a magazine can be moved upwardly during its emptying, thus clearing a space for the fresh, full magazine.

Accordingly, side walls of the hopper 44 in an upper parallel part thereof are spaced apart to such extent that the entire frame arrangement 1 can enter therebetween. Since the ends of the blocking member 5 must project beyond the side walls of the hopper 44 in order to be accessible to the striking levers 11, 12, 13, 14 a part-circular cut-out 46 is formed in each side wall, allowing the blocking member 5 to thus project beyond the side walls. For the purpose of laterally protecting the cigarettes situated in the hopper 44, the cut-outs 46 are closed-off by bridging segments 47 mounted on the shaft 3 for movement with the frame arrangement 1, the bridging segments 47 closing-off the cut-outs 46 completely when the frame arrangement 1 is in the oblique position, and closing-off the cut-outs 46 up to the level of the blocking member 5 when the frame arrangement 1 is in the position 1'. Such a closing of the cut-outs 46 is sufficient, since the magazine 2 is moved upwardly from the position 2", only when the frame arrangement 1 is in the oblique position and is moved into the position 1' and when the supply hopper 44 has been emptied down to the level of the blocking member 5. Whether the frame arrangement 1 is situated in the upper position or in the intermediate position or in the lower position, the cigarettes situated in the supply hopper 6-44 are always limited in the lateral direction by the segment 47.

The container is moved upwardly from the position 2''', after the frame arrangement has been moved to its oblique position, by a vertically operating lifting mechanism which comprises a rod 52 guided in bearings 51 on one of the fixed parts 17 (see FIG. 3) of the device, the rod 52 having a lifting arm 53 for engaging a magazine 2 when in position 2" and moving it upwardly into a position 2'''. A ram 55 movable in a bearing 54 is provided at the level of the magazine position 2''', the ram 55 having an abutment portion 56 for engaging the container 2 when in the position 2''' and pushing it in a horizontal direction onto a collecting platform 57 where for example five magazines can be collected during operation of the device for subsequent removal.

The lifting arm 53 may be arranged for engaging the magazine 2 magnetically, if the magazine is of magnetic material. Alternatively a vacuum engaging mechanism may be provided, or a gripping device in the form of a hinged jaw may be provided. Laterally provided blocking flaps (not illustrated) prevent the magazine from falling downwards, during its movement onto the collecting platform 57.

When sufficient magazines 2 have (in the example, 5) collected on the platform 57 they are moved as a unit onto a lifting and lowering platform 60 by means of a slide 88 which is held by rollers 58 on a horizontal guide track 59. The platform 60, by means of roller slides 61, is movable as a vertical guide member 48 to a desired level. The magazines 2 may be taken from the platform 60 when it has been moved to the desired level, or in order to save more time, may be pushed onto a fixed ramp 63 by a ram plate 99 of a ram 100 movably guided in bearings 62. A number of magazines may be allowed to collect on the ramp 63, for example a complete load for a small removal trolley, before they are removed for refilling with cigarettes. A latch member 106, having a portion co-operating with a fixed abutment, is provided for preventing magazines pushed onto the ramp 63 from falling over.

It will be appreciated that a device as above described is especially useful in plants in which 5, 10, 20 or 30 packing stations are arranged in one or more rows and are supplied with cigarette magazines by trolleys or conveyor paths or the like, the operating personnel of the machines being able to give almost their complete attention to the operation of the packing machines.

The driving arrangements for the feeding device operate as follows:

The conveyor device which is operated by the Maltese cross arrangement, receives its drive from a driving meter M1 by a pulley system 72, 77, the pulley 72 being mounted on a shaft 73. The shaft 73, on which a driving member 71 of the Maltese cross arrangement 70, 71 is provided, serves as a control shaft for the entire driving system of the device, inasmuch as on this shaft 73 a non-illustrated program switching arrangement known per se is provided. The program switching arrangement comprises cam discs and corresponding electric contact sets and controls operation of individual reversibly operable driving motors M2 to M8, the operation of which will be subsequently described. The control of the operation of motor M1 is effected by a photo-electric cell arrangement (not illustrated) which monitors the level of cigarettes in the supply hopper 6, 44.

The device assumes a stand-by condition after a fresh magazine 2 has been introduced into the frame arrangement 1 and the empty magazine has been moved from position 2″ to position 2‴. The frame arrangement 1 remains in its oblique position until the motor M1 is placed into operation in response to the photo-electric cell arrangement monitoring the hopper cigarette level.

Figure 7:
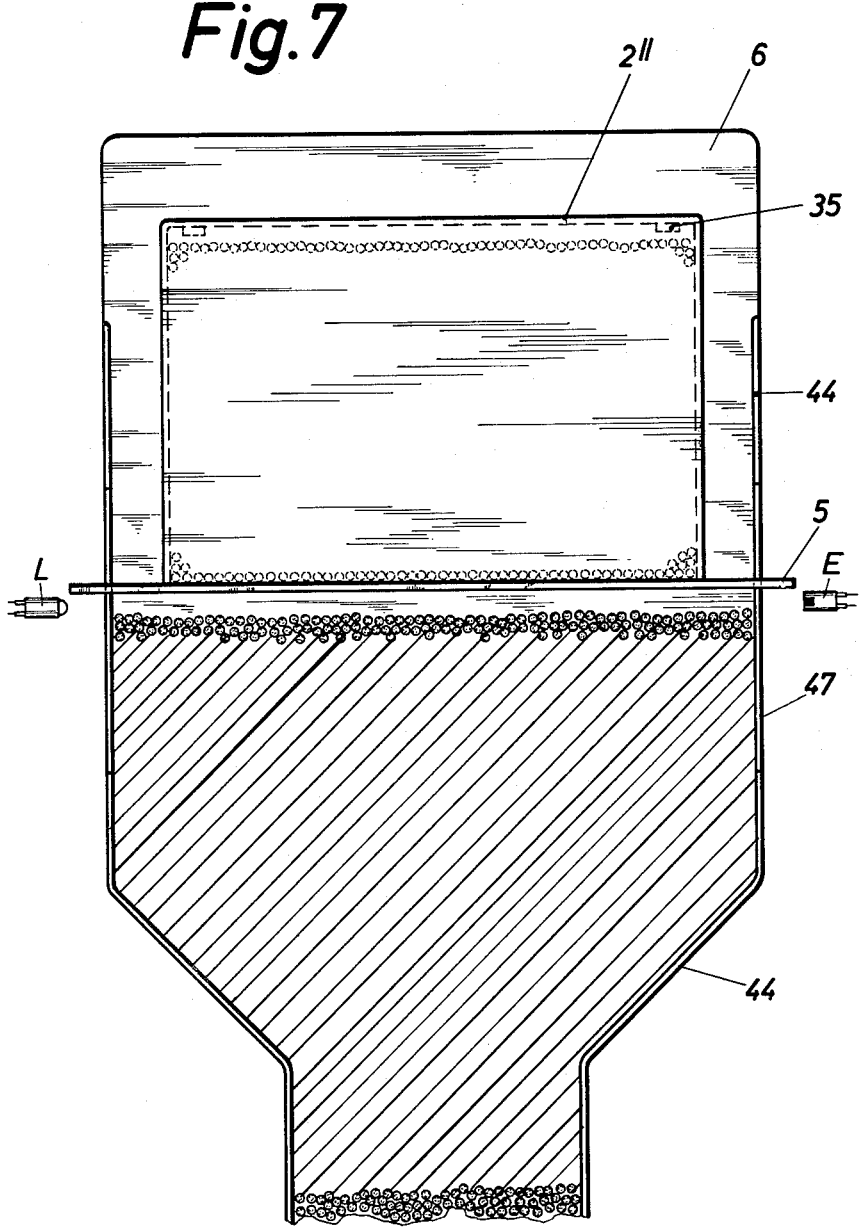
FIG. 7 shows the detail of FIG. 6, but with the frame arrangement omitted and with a closed container in a discharge position.

In the "ready" position, it is assumed that the level in the hopper is above the datum level and a magazine has been swung upwardly but into such a position that it does not disturb the cigarettes situated in the supply hopper 6–44 of the machine. A further (full) magazine has already been brought into an intermediate position. When the automatic packing machine (not shown) has withdrawn cigarettes from the supply hopper to lower the level of the cigarettes to a given point, a photo-electric monitoring arrangement, which includes a light source L and a photoelectric cell E as shown in FIG. 7, causes the omission of a pulse which causes the mechanism to operate. A full magazine moves forwardly over the hopper into position 2″ as shown in FIG. 7, whilst a further pulse operating upon the magnet 6 withdraws the latching lever 27. The striker lever is caused to move, by means of the tension spring 15, and moves the blocking member 5 out of its effective position into the ineffective position. Thereupon the cigarettes in the magazine in position 2″ fall through only a short path into the hopper, as shown in FIG. 8. Now the frame member 1 swings back into the original position and the magazine is displaced upwardly. It will be understood that, after the tipping up operation of the magazine, the latter is drawn upwardly and thus emptied into the supply hopper and this upward movement takes place before the hopper is emptied by the normal work of the packing machine. Thus it is not necessary to wait for the hopper to get into the lower level condition before setting up the new magazine which has been filled. In order that there shall be time for the setting up of the new full magazine, the position in which the latter is to be placed must already be vacant, as shown in FIG. 9. For this purpose it is arranged in accordance with the invention that the preceding magazine shall be moved upwardly through the appropriate distance.

The lifting mechanism 78, 79 is guided on guide rods 80 and is driven from motor M2 by a chain 84, chain wheels 85, 86, a chain 81 and chain wheels 82, 83.

Movement of the frame arrangement 1 is effected by motor M7 which has a drive shaft 109 engaging the shaft 3 by a worm gear mechanism 108.

The lifting arm 53 is operated by means of the rod 52 which is linked to a chain 112 entrained over two chain wheels 110 and 111, chain wheel 111 being rotatable by a worm gear mechanism 113 operable by motor M6. The ram 55 has a toothed rack formed thereon and is movable by engagement, with the rack, of a pinion 87 carried on motor M5.

The slide 88 is linked to a chain 91 entrained over chain wheels 89 and 90, chain wheel 89 carrying a toothed wheel 93 which is driven by a toothed wheel 92 carried on motor M3.

The lifting and lowering platform 60 is linked to a chain 96 which is entrained over chain wheels 94 and 95, chain wheel 94 being fixed to a toothed wheel 97 which is driven by a toothed wheel 98 carried on motor M4.

The ram plate 99 is operated by the ram 100 which is linked to a chain 103 entrained over two chain wheels 101 and 102, chain wheel 102 being fixed to a toothed wheel 105 which is driven by a toothed wheel 104 carried on motor M8, the motor M8 being mounted on a bar 115.

It should be clearly understood that the embodiment described and illustrated is given by way of example and that many modifications, additions and omissions are possible without departing from the spirit of my invention.

I claim:

1. Mechanism for feeding elongated articles of the class described to a packing machine having a hopper for receiving the said articles, said mechanism comprising the combination of a frame arrangement adapted to assume an oblique position to receive an upwardly open magazine containing said articles, means for moving said frame arrangement from said position to bring said magazine into a substantially vertical but inverted position over the hopper ready for discharge of said articles, means carried by the frame arrangement for covering the opening of the magazine when in the inverted position, means for uncovering the magazine, and means for imparting a vertically upward movement to the magazine to facilitate the discharge of the contents into the hopper.

2. Mechanism according to claim 1, wherein the means for imparting vertically upward movement to the magazine from the ready position comprises a lifting arm having a length of stroke sufficient to raise the magazine through a vertical distance allowing the positioning of a succeeding full magazine in the ready position vacated by the preceding magazine.

3. Mechanism according to claim 1, wherein the means for covering the magazine opening comprises a member defining a bottom of the frame arrangement when the frame arrangement is in its substantially vertical position, said bottom member being displaceable in a direction substantially parallel to its transverse axis and being adapted for blocking the discharge opening of the magazine until the frame arrangement has been moved into the substantially vertical position.

4. Mechanism according to claim 1, comprising means for successively transporting magazines of cigarettes to the frame arrangement when the frame arrangement is in the oblique position and wherein said transporting means comprises a conveyor device for successively conveying magazines when placed on said conveyor device in positions substantially parallel to the said oblique position of the frame arrangement, a lifting device which is adapted to successively lift said magazines on to the frame arrangement, and means for engaging each successive magazine in the frame arrangement prior to the moving of the frame arrangement into the substantially vertical position.

5. Mechanism according to claim 3, comprising a lever arrangement for moving the bottom member into its non-blocking position when the frame arrangement is in its substantially vertical position, a spring loaded pivotally mounted lever forming part of said lever arrangement and being arranged for striking the bottom member, and releasable detent means for normally holding the striking lever out of contact with the bottom member.

6. Mechanism according to claim 3, wherein the width of the frame arrangement is less than the free width of an upper part of said supply hopper, the ends of the displaceable bottom member of the frame arrangement extending beyond the width of the said upper hopper part and being receivable in part-circular cut-outs in side walls of the hopper on movement of the frame arrangement into the substantially vertical position, and having segment members movable with the frame arrangement for blocking said cut-outs so that when the frame arrangement is in the substantially vertical position the segment members close off the cut-outs only below the displaceable bottom member whereas when the frame arrangement is in the oblique position the segment members close off the cut-outs substantially entirely.

7. Mechanism according to claim 4, comprising also means for displacing said discharged magazines from the position above the hopper in a substantially horizontal direction, and a supporting member for receiving a plurality of said displaced magazines in series.

8. Mechanism according to claim 7, comprising means for lowering said magazine supporting member with the empty magazines thereon substantially to the level of the conveyor device.

9. Mechanism according to claim 8, comprising a platform at the said lower level for receiving empty magazines, and means for pushing magazines received on said platform in the longitudinal direction of the conveyor device.

References Cited by the Examiner

UNITED STATES PATENTS

| | | | |
|---|---|---|---|
| 1,907,457 | 5/1933 | Stevenson | 214—306 |
| 2,574,628 | 11/1951 | Dearsley | 214—302 |
| 2,653,723 | 9/1953 | Bergman | 214—302 |
| 2,681,160 | 6/1954 | Molins et al. | 214—302 |
| 2,799,413 | 7/1957 | Innocenti | 214—302 |

GERALD M. FORLENZA, *Primary Examiner.*

HUGO O. SCHULZ, *Examiner.*